(12) United States Patent
Ohnishi et al.

(10) Patent No.: US 8,911,029 B2
(45) Date of Patent: Dec. 16, 2014

(54) ELECTRIC BRAKING DEVICE

(75) Inventors: Takaaki Ohnishi, Saitama (JP); Kunimichi Hatano, Saitama (JP); Arata Inoue, Saitama (JP); Hideo Miyabayashi, Tochigi (JP); Osamu Adachi, Tochigi (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 257 days.

(21) Appl. No.: 13/433,549

(22) Filed: Mar. 29, 2012

(65) Prior Publication Data
US 2012/0248862 A1 Oct. 4, 2012

(30) Foreign Application Priority Data
Mar. 31, 2011 (JP) ................... 2011-079147

(51) Int. Cl.
*B60T 13/00* (2006.01)
*B60T 13/74* (2006.01)

(52) U.S. Cl.
CPC ................... *B60T 13/745* (2013.01)
USPC ...... 303/20; 303/114.1; 303/115.2; 188/71.9; 188/162; 188/358

(58) Field of Classification Search
USPC ............. 303/20, 114.1, 115.2, 155; 188/71.7, 188/71.9, 72.1, 72.8, 162, 358; 60/545, 60/538, 593
See application file for complete search history.

(56) References Cited

U.S. PATENT DOCUMENTS

| | | | | |
|---|---|---|---|---|
| 4,395,883 A | * | 8/1983 | Melinat ........................... | 60/545 |
| 4,918,921 A | * | 4/1990 | Leigh-Monstevens et al. | 60/545 |
| 7,651,176 B2 | | 1/2010 | Inoue et al. | |
| 7,823,985 B2 | * | 11/2010 | Hatano ....................... | 303/115.2 |
| 8,328,297 B2 | * | 12/2012 | Hatano ....................... | 303/115.1 |
| 8,468,820 B2 | * | 6/2013 | Drumm ......................... | 60/545 |
| 2005/0252734 A1 | * | 11/2005 | Giering ........................ | 188/72.8 |
| 2005/0253450 A1 | * | 11/2005 | Giering et al. ............. | 303/115.1 |
| 2013/0239567 A1 | * | 9/2013 | Ohnishi et al. ................. | 60/545 |

FOREIGN PATENT DOCUMENTS

| | | |
|---|---|---|
| JP | H07-108916 A | 4/1995 |
| JP | H08-232991 A | 9/1996 |
| JP | 2001-225739 A | 8/2001 |
| JP | 2008-143419 A | 6/2008 |
| JP | 2010-013069 A | 1/2010 |

OTHER PUBLICATIONS

Japanese Office Action (Notification of Reasons for Refusal) sent on Dec. 10, 2013, issued in corresponding JP patent application 2011-079147.

* cited by examiner

*Primary Examiner* — Thomas J Williams
*Assistant Examiner* — Mariano Sy
(74) *Attorney, Agent, or Firm* — Carrier Blackman & Associates, P.C.; Joseph P. Carrier; Fulchand P. Shende

(57) ABSTRACT

In an electric braking device that produces brake fluid pressure by driving a second slave piston in the axial direction with the driving force by a motor, a driving force transmission mechanism for transferring the driving force by the motor includes a nut that rotates upon reception of the rotational driving force by the motor, and a ball screw shaft which is engaged with the nut and is movable in the axial direction and which abuts the second slave piston. The electric braking device further includes a worn-out reducer for reducing the worn-out of a contact part between the ball screw shaft and the second slave piston.

10 Claims, 7 Drawing Sheets

ELECTRIC BRAKING DEVICE

CROSS REFERENCE TO RELATED APPLICATIONS

This application claims the foreign priority benefit under 35 U.S.C. §119 of Japanese Patent Application No. 2011-079147 filed on Mar. 31, 2011, the disclosure of which is incorporated herein by reference.

BACKGROUND OF THE INVENTION

1. Field of the Invention

The present invention relates to an electric braking device, and more specifically, an electric braking device that actuates a piston in the axial direction by the driving force of a motor to produce brake fluid pressure.

2. Description of the Related Art

A vehicular braking device is known that includes a master cylinder to which a braking operation by an operator is input and a slave cylinder which is an electric braking device and which produces brake fluid pressure based on an electric signal in accordance with the braking operation (see, for example, JP 2008-143419 A).

According to the slave cylinder of this vehicular braking device, upon driving of the motor, a piston is forwarded through a gear mechanism and a ball screw mechanism having a nut and a screw engaged with the nut. That is, the nut receives the rotational driving force by the motor, and the screw engaged with the nut moves in the axial direction to push the piston, thereby moving the piston forward. Accordingly, brake fluid pressure is produced in the fluid pressure chamber formed ahead of the piston, and the brake fluid pressure is output to the brake lines via ports.

According to the above-explained slave cylinder, however, the worn-out of the contact part between the screw and the piston affects the abutting condition of the screw to the piston, and the piston pushed by the screw may be fallen (tilted). Such fall-down of the piston results in the worn-out and damage of the piston and a seal member attached to the piston, etc.

The present invention has been made in view of such a circumstance, and it is an object of the present invention to provide an electric braking device that ensures a stable abutment of a screw to a piston.

SUMMARY OF THE INVENTION

To achieve the object, a first aspect of the present invention provides an electric braking device that includes: a cylinder part that retains thereinside a piston movable in an axial direction; a motor for driving the piston; and a driving force transmission mechanism that transfers driving force by the motor to the piston, the electric braking device producing brake fluid pressure by driving the piston in the axial direction with the driving force by the motor, the driving force transmission mechanism comprising: a nut that is rotated upon reception of rotational driving force by the motor; and a screw which is engaged with the nut in a movable condition in the axial direction and which abuts the piston, the electric braking device further comprising a worn-out reducer for reducing a worn-out of a contact part between the screw and the piston.

According to the present invention, it becomes possible to reduce the worn-out of a contact part between the screw and the piston and to ensure a stable abutment of the screw with the piston. Accordingly, it becomes possible to suppress falling of the piston when the piston is driven in the axial direction, and to suppress the worn-out and damage of the piston, a sliding face of the cylinder part with the piston, and the seal member added to the piston, etc.

A second aspect of the present invention provides the electric braking device of the first aspect, in which the worn-out reducer includes an abutting face of the piston with the screw formed in a flat shape and a tip of the screw at the piston side formed in a convex curved shape.

According to the present invention, the tip of the screw in the convex curved shape contacts the flat abutting face of the piston in a point-by-point contact manner, and the tip of the screw hardly receives force in the radial direction from the abutting face of the piston. Accordingly, it becomes possible to reduce the worn-out of a contact part between the screw and the piston and to ensure a stable abutment of the screw with the piston. Hence, it becomes possible to suppress falling of the piston when the piston is driven in the axial direction, and to suppress the worn-out and damage of the piston, a sliding face of the cylinder part with the piston, and the seal member added to the piston, etc.

When, for example, the tip of the screw and the abutting face of the piston are concavo and convex spherical surfaces, an axial alignment effect acts in a direction in which the axial misalignment (wobbling: a displacement of the axis from the reference center position) of the tip of the screw is addressed, and the tip of the screw receives force in the radial direction from the piston. As a result, this contact part becomes worn out and pressing load in an oblique direction to the axial direction of the piston is input from the screw to the worn-out portion, often making the piston tilted. Moreover, when, for example, the tip of the screw and the abutting face of the piston are both flat surfaces, both surfaces may partially contact with each other due to the axial misalignment, and thus this contact part is often worn out. Furthermore, when the tip of the shaft and the abutting face of the piston contact in a plane-by-plane contact manner, the piston is rotated together with the rotation of the screw, and thus the contact part between both members and the seal member added to the second slave piston may be worn out. In contrast, according to the abutment structure of the screw and the piston of the present invention, such technical issues can be addressed.

A third aspect of the present invention provides the electric braking device of the first or second aspect which further includes a regulator which is disposed on an outer circumference of the piston to regulate a displacement of the piston in a radial direction, and the regulator is located at the driving-force-transmission-mechanism side beyond the abutting face in the axial direction of the piston.

According to the present invention, in addition to the advantages of the first and second aspects of the present invention, since the displacement of the piston in the radial direction is regulated at the driving-force-transmission-mechanism side beyond the abutting face of the piston with the screw, a falling of the piston when the screw pushes the piston can be suppressed. Accordingly, it becomes possible to also suppress a worn-out of the contact part between the screw and the piston.

A fourth aspect of the present invention provides the electronic braking device of the third aspect, in which at a maximum movable position of the piston toward the driving force transmission mechanism, the piston has a first end disposed toward a fluid pressure chamber formed opposite to the driving force transmission mechanism, and has a second end protruding toward a housing retaining the driving force transmission mechanism.

According to the present invention, in addition to the advantage of the third aspect of the present invention, the large piston support length is ensured without increasing the dimension of the electric braking device in the direction of the axis of the piston, thereby further surely suppressing a falling of the piston. Moreover, it becomes also possible to prevent the brake fluid in the cylinder from entering in the housing.

A fifth aspect of the present invention provides the electric braking device of the third or fourth aspect, in which the cylinder part comprising a cylinder body retaining thereinside the piston in a slidable manner, and an annular guide which is retained in the cylinder body to fluid-tightly seal a space between the outer circumference of the piston and the driving force transmission mechanism, and which guides the piston movable in the axial direction of the piston, and the guide includes the regulator.

According to the present invention, in addition to the advantages of the third and fourth aspect of the present invention, the piston is moved in the axial direction with the outer circumference thereof being guided by the annular guide, and the guide position by the guide over the outer circumference of the piston moves toward the driving force transmission mechanism over the piston relative to the movement of the piston in the axial direction in the opposite direction to the driving force transmission mechanism. As a result, the support length (the guide length) over the outer circumference of the piston that is a distance between the driving force transmission mechanism and another guide position at the opposite side becomes long. Hence, it becomes possible to further effectively suppress a falling of the piston when the piston is driven in the axial direction.

According to the present invention, it becomes possible to provide an electric braking device which can ensure a stable abutment of a screw to a piston.

DETAILED DESCRIPTION OF THE PREFERRED EMBODIMENT

A detailed explanation will be given of an embodiment of the present invention with reference to the accompanying drawings as needed.

Figure 1:
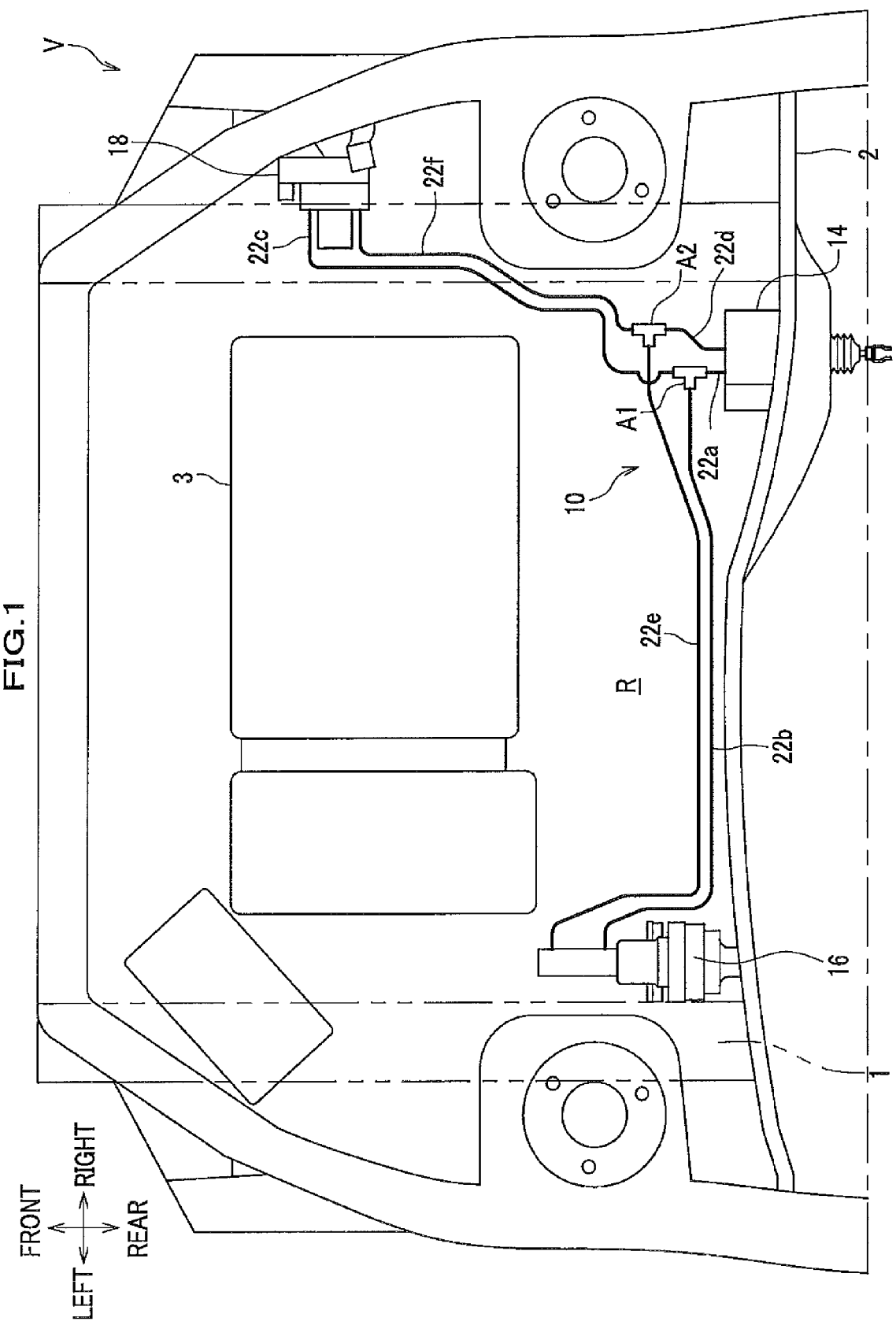
FIG. 1 is a diagram showing a layout and a configuration of a vehicular braking system in a vehicle including an electric braking device according to an embodiment of the present invention.

FIG. 1 is a diagram showing a layout and a configuration of a vehicular braking system in a vehicle including an electric braking device according to an embodiment of the present invention. FIG. 1 also shows the front-back direction and the right-left direction of a vehicle V by arrows.

A vehicular braking system 10 of this embodiment includes both by-wire braking system for a normal operation which actuates a brake through a transmission of an electric signal, and conventional hydraulic braking system for fail safe which actuates the brake through a transmission of hydraulic pressure.

As shown in FIG. 1, the vehicular braking system 10 includes an input device 14 to which a braking operation given by an operator (a driver) is input, a motor cylinder device 16 that is an electric braking device which produces brake fluid pressure based on an electric signal in accordance with at least the braking operation, and a vehicle stability assisting device 18 (hereinafter, referred to as a VSA device 18. Note that VSA is a registered trademark) that is a vehicle behavior stabilizing device which assists stabilization of the behavior of the vehicle based on the brake fluid pressure produced by the motor cylinder device 16.

The motor cylinder device 16 may be configured to generate the brake fluid pressure based on not only an electric signal in accordance with a braking operation given by the driver but also an electric signal based on the other physical quantity. An example electric signal based on the other physical quantity is a signal output by an automatic braking system that causes an ECU (Electronic Control Unit) to determine a surrounding condition of the vehicle V through a sensor, etc., to avoid a collision, etc., of the vehicle V regardless of the braking operation by the driver.

The input device 14 is adopted for a right-hand drive vehicle in this example, and is fastened to the right portion of a dashboard 2 in the vehicle width direction by, for example, a bolt. The input device 14 may be adopted for a left-hand drive vehicle. The motor cylinder device 16 is disposed at, for example, the left side in the vehicle width direction opposite to the input device, and is attached to a portion of a vehicle body 1 like a left side frame via an attachment bracket (unillustrated). The VSA device 18 has an ABS (Anti-lock Braking System) function the suppresses locking of a wheel at the time of braking, a TCS (Traction Control System) function that suppresses spinning of the wheel at the time of acceleration, etc., and a function of suppressing skidding at the time of turning, and the like, and is attached to, for example, the vehicle body via a bracket at the right front end in the vehicle width direction. An ABS device having the ABS function of suppressing wheel locking at the time of braking only may be connected instead of the VSA device 18. Respective detailed internal configurations of the input device 14, the motor cylinder device 16, and the VSA device 18 will be discussed later.

Those input device 14, the motor cylinder device 16, and the VSA device 18 are disposed in a structural-object mounting room R which is provided ahead of the dashboard 2 of the vehicle V and in which structural objects 3 like an engine and a motor for running are mounted in a manner separated from one another via piping tubes 22a to 22f. The vehicular braking system 10 can be applied to any of the front-wheel-drive vehicle, a rear-wheel-drive vehicle, and a four-wheel-drive vehicle. Moreover, as a by-wire braking system, the input device 14 and the motor cylinder device 16 are electrically connected to control means like an ECU via unillustrated harnesses.

Figure 2:
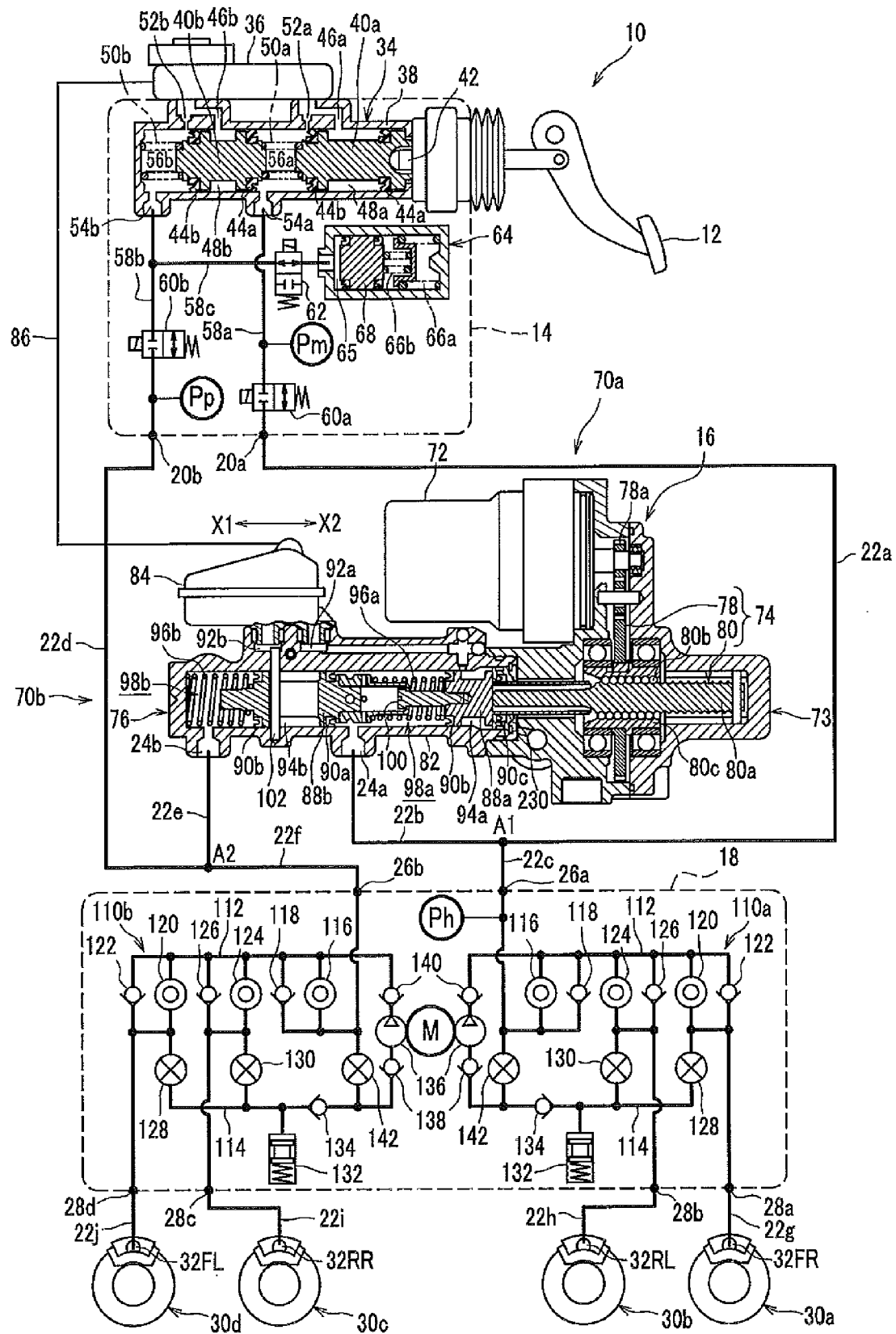
FIG. 2 is a diagram showing a general configuration of the vehicular brake system.

FIG. 2 is a diagram showing a general configuration of the vehicular braking system.

An explanation will now be given of a hydraulic pressure line. With reference to a coupling point A1 in FIG. 2, a connection port 20a of the input device 14 is connected to the coupling point A1 via a first piping tube 22a, an output port 24a of the motor cylinder device 16 is connected to the coupling point A1 via a second piping tube 22b, and an inlet port 26a of the VSA device 18 is connected to the coupling point A1 via a third piping tube 22c.

With reference to another coupling point A2 in FIG. 2, another connection port 20b of the input device 14 is connected to the coupling point A2 via a fourth piping tube 22d, another output port 24b of the motor cylinder device 16 is connected to the coupling point A2 via a fifth piping tube 22e, and another inlet port 26b of the VSA device 18 is connected to the coupling point A2 via a sixth piping tube 22f.

The VSA device 18 is provided with a plurality of outlet ports 28a to 28d. A first outlet port 28a is connected to a wheel cylinder 32FR of a disc brake mechanism 30a provided at the front right wheel via a seventh piping tube 22g. A second outlet port 28b is connected to a wheel cylinder 32RL of a disc brake mechanism 30b provided at the rear left wheel via an eighth piping tube 22h. A third outlet port 28c is connected to a wheel cylinder 32RR of a disc brake mechanism 30c provided at the rear right wheel via a ninth piping tube 22i. A fourth outlet port 28d is connected to a wheel cylinder 32FL of a disc brake mechanism 30d provided at the front left wheel via a tenth piping tube 22j.

In this case, respective piping tubes 22g to 22j connected to the outlet ports 28a to 28d supply a brake fluid to respective wheel cylinders 32FR, 32RL, 32RR, and 32FL of the disc brake mechanisms 30a to 30d, and the hydraulic pressures in respective wheel cylinders 32FR, 32RL, 32RR, and 32FL increase, so that respective wheel cylinders 32FR, 32RL, 32RR, and 32FL are actuated, thereby applying braking forces to corresponding wheels (front right wheel, rear left wheel, rear right wheel, and front left wheel).

The vehicular braking system 10 is provided so as to be applicable to various vehicles, such as a vehicle driven only by an engine (internal combustion engine), a hybrid vehicle, an electric vehicle, and a fuel cell vehicle.

The input device 14 includes a tandem master cylinder 34 that can produce fluid pressure in accordance with an operation given by the driver to a brake pedal 12, and a first reservoir 36 added to the master cylinder 34. Provided in a cylinder tube 38 of the master cylinder 34 are second piston 40a and a first piston 40b in a slidable manner along the axial direction of the cylinder tube 38 and spaced apart from each other at a predetermined clearance. The second piston 40a is disposed near the brake pedal 12, and is connected with the brake pedal 12 via a push rod 42. Moreover, the first piston 40b is disposed so as to be further distant from the brake pedal 12 than the second piston 40a.

A pair of cup seals 44a and 44b are attached to respective outer peripherys of the second piston 40a and the first piston 40b through respective annular grooves. Formed between the pair of cup seals 44a and 44b are back chambers 48a and 48b connected with supply ports 46a and 46b, respectively, which will be discussed later. Moreover, provided between the second piston 40a and the first piston 40b is a spring 50a, and another spring 50b is also provided between the first piston 40b and the front end of the cylinder tube 38.

Seal members may be provided at respective portions of the inner periphery of the cylinder tube 38 instead of providing the cup seals 44a and 44b on the outer peripherys of respective second piston 40a and first piston 40b.

The cylinder tube 38 of the master cylinder 34 is provided with two supply ports 46a and 46b, two relief ports 52a, 52b, and two output ports 54a, 54b. In this case, each supply port 46a (46b) and each relief port 52a (52b) are provided so as to be joined together and communicated with an unillustrated reservoir chamber in the first reservoir 36.

Moreover, provided in the cylinder tube 38 of the master cylinder 34 are a second pressure chamber 56a and a first pressure chamber 56b that produce brake fluid pressure in accordance with a pedal pressure by the driver stepping on the brake pedal 12. The second pressure chamber 56a is provided so as to be communicated with the connection port 20a via a second fluid pressure line 58a, and the first pressure chamber 56b is provided so as to be communicated with another connection port 20b via a first fluid pressure line 58b.

A pressure sensor Pm is provided between the master cylinder 34 and the connection port 20a and at the upstream side of the second fluid pressure line 58a. A second cutoff valve 60a that is a normal open type solenoid valve is provided at the downstream side of the second fluid pressure line 58a. The pressure sensor Pm detects fluid pressure in the second fluid pressure line 58a at the upstream thereof at the master-cylinder-34 side beyond the second cutoff valve 60a.

A first cutoff valve 60b that is a normal open type solenoid valve is provided between the master cylinder 34 and another connection port 20b and at the upstream side of the first fluid pressure line 58b. A pressure sensor Pp is provided at the downstream side of the first fluid pressure line 58b. The pressure sensor Pp detects fluid pressure at the downstream side of the first fluid pressure line 58b at the side of wheel cylinders 32FR, 32RL, 32RR, and 32FL beyond the first cutoff valve 60b.

The term "normal open" of the second cutoff valve 60a and the first cutoff valve 60b means valve having a normal position (the position of a valve element at the time of demagnetizing (electrically non-conducted)) in an open position (normally open). FIG. 2 shows the second cutoff valve 60a and the first cutoff valve 60b in an excited state (the same is true for a third cutoff valve 62 to be discussed later).

Provided in the first fluid pressure line 58b between the master cylinder 34 and the first cutoff valve 60b is a branched fluid pressure line 58c branched from the first fluid pressure line 58b, and the branched fluid pressure line 58c is connected in series with the third cutoff valve 62 that is a normal close type solenoid valve, and a stroke simulator 64. The term "normal close" of the third cutoff valve 62 means a valve having a normal position (the position of a valve element at the time of demagnetizing (electrically non-conducted)) in close position (normally closed).

The stroke simulator 64 is disposed over the first fluid pressure line 58b and at the master-cylinder-34 side beyond the first cutoff valve 60b. The stroke simulator 64 is provided with a fluid pressure chamber 65 communicated with the branched fluid pressure line 58c, and is capable of absorbing the brake fluid discharged from the first pressure chamber 56b of the master cylinder 34 via the fluid pressure chamber 65.

The stroke simulator 64 includes a first return spring 66a with a higher spring constant and a second return spring 66b with a lower spring constant both disposed in series, and a simulator piston 68 biased by the first and second return springs 66a and 66b. The stroke simulator 64 is provided so as to set the increased gradient of pedal reactive force low during the beginning of the stepping of the brake pedal 12 and to set the pedal reactive force high during the later phase of the stepping, thereby setting the pedal feeling of the brake pedal 12 to be similar to that of the conventional master cylinder.

The fluid pressure line can be divided broadly into a second fluid pressure system 70a which connects the second pressure chamber 56a of the master cylinder 34 with the plurality of wheel cylinders 32FR and 32RL, and a first fluid pressure system 70b which connects the first pressure chamber 56b of the master cylinder 34 with the plurality of wheel cylinders 32 RR and 32FL.

The second fluid pressure system 70a includes the second fluid pressure line 58a that connects the output port 54a of the master cylinder 34 (the cylinder tube 38) with the connection port 20a of the input device 14, the piping tubes 22a and 22b that connect the connection port 20a of the input device 14 with the output port 24a of the motor cylinder device 16, the piping tubes 22b and 22c that connect the output port 24a of the motor cylinder device 16 with the inlet port 26a of the VSA device 18, and the piping tubes 22g and 22h that connect the outlet ports 28a and 28b of the VSA device 18 with the wheel cylinders 32FR and 32RL, respectively.

The first fluid pressure system 70b includes the first fluid pressure line 58b that connects the output port 54b of the master cylinder 34 (the cylinder tube 38) with another connection port 20b of the input device 14, the piping tubes 22d and 22e that connect another connection port 20b of the input device 14 with the output port 24b of the motor cylinder device 16, the piping tubes 22e and 22f that connect the output port 24b of the motor cylinder device 16 with the inlet port 26b of the VSA device 18, and the piping tubes 22i and 22j that connect the outlet ports 28c and 28d of the VSA device 18 with the wheel cylinders 32RR and 32FL, respectively.

The motor cylinder device 16 is an electric braking device that produces brake fluid pressure by actuating a second slave piston 88a and a first slave piston 88b in the axial direction through the driving force by an electric motor 72. In the motor cylinder device 16, the traveling direction (the direction of an arrow X1 in FIG. 2) of the second and first slave pistons 88a and 88b when brake fluid pressure is produced (increased) is defined as a "forward" direction, and the opposite direction (the direction of an arrow X2 in FIG. 2) thereof is defined as a "rearward" direction.

The motor cylinder device 16 includes a cylinder part 76 that retains the second and first slave pistons 88a and 88b movable in the axial direction, the motor 72 for driving the second and first slave pistons 88a and 88b, and a driving force transmission unit 73 that transfers the driving force by the motor 72 to the second and first slave pistons 88a and 88b.

The driving force transmission unit 73 has a driving force transmission mechanism 74 including a gear mechanism (a reduction mechanism) 78 that transfers the rotational driving force by the motor 72, a ball screw structure 80 having a nut 80c received by the rotational driving force and converting such a rotational driving force into linear driving force along the axial direction of the ball screw shaft (a screw) 80a connected with the nut 80c via a ball 80b.

The cylinder part 76 includes a substantially cylindrical cylinder body 82, and a second reservoir 84 added to the cylinder body 82. The second reservoir 84 is connected with the first reservoir 36 provided in the master cylinder 34 of the input device 14 via a piping tube 86, and the brake fluid stored in the first reservoir 36 is supplied to the interior of the second reservoir 84 through the piping tube 86.

The second and first slave pistons 88a and 88b are disposed in the cylinder body 82 so as to be spaced apart from each other at a predetermined clearance along the axial direction of the cylinder body 82 and in a freely slidable manner. The second slave piston 88a is disposed near the ball screw structure 80, and abuts a tip 240 (see FIG. 7) of the ball screw shaft 80a, and thus moving in the direction of the arrow X1 or X2 together with the ball screw shaft 80a. Moreover, the first slave piston 88b is disposed so as to be more distant from the ball screw structure 80 than the second slave piston 88a.

An annular guide piston (a guide) 230 which fluid-tightly seals a space between the outer periphery of the second slave piston 88a and the driving force transmission mechanism 74 and which guides the second slave piston 88a in a movable manner in the axial direction is disposed so as to face the outer periphery of the second slave piston 88a. A cup seal 90c is attached to the inner periphery of the guide piston 230. Moreover, a slave cup seal 90b is attached to the outer periphery of the front end of the second slave piston 88a through an annular groove. A second back chamber 94a communicated with a reservoir port 92a to be discussed later is formed between the cup seal 90c and the slave cup seal 90b. A second return spring 96a is disposed between the second slave piston 88a and the first slave piston 88b.

On the other hand, a pair of slave cup seals 90a and 90b are attached to the outer periphery of the first slave piston 88b through respective annular grooves. A first back chamber 94b communicated with a reservoir port 92b to be discussed later is formed between the pair of slave cup seals 90a and 90b. A first return spring 96b is disposed between the first slave piston 88b and the front end of the cylinder body 82.

The cylinder body 82 of the cylinder part 76 is provided with the two reservoir ports 92a and 92b and the two output ports 24a and 24b. In this case, the reservoir port 92a (92b) is communicated with the reservoir chamber in the second reservoir 84.

Moreover, provided in the cylinder body 82 are a second fluid pressure chamber 98a that produces brake fluid pressure output from the output port 24a to the wheel cylinders 32FR and 32RL, and a first fluid pressure chamber 98b that produces brake fluid pressure output from another output port 24b to the wheel cylinders 32RR and 32FL.

A regulator 100 that regulates the maximum distance and the minimum distance between the second slave piston 88a and the first slave piston 88b is provided between the second slave piston 88a and the first slave piston 88b. Moreover, the first slave piston 88b is provided with a stopper pin 102 which regulates the sliding range of the first slave piston 88b and which suppresses over return toward the second slave piston 88a. Hence, in the case of, in particular, a backup operation in which the control is made by the brake fluid pressure produced by the master cylinder 34, a defect by a system when another system breaks down can be suppressed.

The VSA device 18 is a conventionally well-known device, and includes a second brake system 110a that controls the second fluid pressure system 70a connected to the disc brake mechanisms 30a and 30b (the wheel cylinders 32FR and 32RL) of the front right and rear left wheels, and a first brake system 110b that controls the first fluid pressure system 70b connected to the disc brake mechanisms 30c and 30d (the wheel cylinders 32RR and 32FL) of the rear right and front left wheels.

The combination of the connections between the second and first brake systems 110a and 110b and respective disc brake mechanisms 30a, 30b, 30c, and 30d is not limited to the above-explained example, and as long as two systems independent from each other is ensured, the following combination can be employed. That is, it is not illustrated in the figure but the second brake system 110a may be a fluid pressure system connected to the disc brake mechanisms of the front left and front right wheels, and the first brake system 110b may be a fluid pressure system connected to the disc brake mechanisms of the rear left and rear right wheels. Moreover, the second brake system 110a may be a fluid pressure system connected to the disc brake mechanisms of the front right and rear right wheels at a side of the vehicle body, and the first brake system 110b may be a fluid pressure system connected to the disc brake mechanisms of the front left and rear left wheels at another side of the vehicle body. Furthermore, the second brake system 110a may be a fluid pressure system connected to the disc brake mechanisms of the front right and front left wheels, and the first brake system 110b may be a fluid pressure system connected to the disc brake mechanisms of the rear right and rear left wheels.

The second brake system 110a and the first brake system 110b employ the same structure. Hence, the corresponding portions between the second brake system 110a and the first brake system 110b are denoted by the same reference numeral, and the following explanation will be mainly given of the second brake system 110a. The explanation for the first brake system 110b will be added as needed as a parenthetic explanation.

The second brake system 110a (the first brake system 110b) includes a first common fluid pressure line 112 and a second common fluid pressure line 114 for the wheel cylinders 32FR and 32RL (32RR and 32FL). The VSA device 18 includes a regulator valve 116 which is disposed between the inlet port 26a and the first common fluid pressure line 112 and which is a normal open type solenoid valve, a first check valve 118 which is disposed in parallel with the regulator valve 116 and which permits a flow of the brake fluid from the inlet port 26a to the first common fluid pressure line 112 (suppresses a flow of the brake fluid from the first common fluid pressure line 112 to the inlet port 26a), a first in-valve 120 which is disposed between the first common fluid pressure line 112 and the first outlet port 28a and which is a normal open type solenoid valve, a second check valve 122 which is disposed in parallel with the first in-valve 120 and which permits a flow of the brake fluid from the first outlet port 28a to the first common fluid pressure line 112 (suppresses a flow of the brake fluid from the first common fluid pressure line 112 to the first outlet port 28a), a second in-valve 124 which is disposed between the first common fluid pressure line 112 and the second outlet port 28b and which is a normal open type solenoid valve, and a third check valve 126 which is disposed in parallel with the second in-valve 124 and which permits a flow of the brake fluid from the second outlet port 28b to the first common fluid pressure line 112 (suppresses a flow of the brake fluid from the first common fluid pressure line 112 to the second outlet port 28b).

The VSA device 18 also includes a first out-valve 128 which is disposed between the first outlet port 28a and the second common fluid pressure line 114 and which is a normal close type solenoid valve, a second out-valve 130 which is disposed between the second outlet port 28b and the second common fluid pressure line 114 that is a normal close type solenoid valve, a reservoir 132 connected to the second common fluid pressure line 114, a fourth check valve 134 which is disposed between the first common fluid pressure line 112 and the second common fluid pressure line 114 and which permits a flow of the brake fluid from the second common fluid pressure line 114 to the first common fluid pressure line 112 (suppresses a flow of the brake fluid from the first common fluid pressure line 112 to the second common fluid pressure line 114), a pump 136 which is disposed between the fourth check valve 134 and the first common fluid pressure line 112 and which supplies the brake fluid from the second common fluid pressure line 114 to the first common fluid pressure line 112, an inlet valve 138 and an outlet valve 140 provided at the front and rear of the pump 136, a motor M that drives the pump 136, and a suction valve 142 which is disposed between the second common fluid pressure line 114 and the inlet port 26a and which is a normal close type solenoid valve.

In the second brake system 110a, a pressure sensor Ph which detects the brake fluid pressure output from the output port 24a of the motor cylinder device 16 and produced by the second fluid pressure chamber 98a of the motor cylinder device 16 is provided over the fluid pressure line near the inlet port 26a. Detection signals generated upon detection operations of respective pressure sensors Pm, Pp, and Ph are input into an unillustrated control unit.

The vehicular braking system 10 of this embodiment employs the above-explained basic configuration, and the operation and the advantage of such a braking system will be explained next.

In the normal condition having the vehicular braking system 10 normally operated, the second cutoff valve 60a and the first cutoff valve 60b each of which is the normal open type solenoid valve are closed by excitation, and the third cutoff valve 62 that is the normal close type solenoid valve is opened by excitation (see FIG. 2). Hence, the second and first cutoff valves 60a and 60b close the second and first fluid pressure systems 70a and 70b, and thus no brake fluid pressure produced by the master cylinder 34 of the input device 14 is transferred to the wheel cylinders 32FR, 32RL, 32RR, and 32FL of respective disc brake mechanisms 30a to 30d.

At this time, the brake fluid pressure produced by the first pressure chamber 56b of the master cylinder 34 is transferred to the fluid pressure chamber 65 of the stroke simulator 64 through the branched fluid pressure line 58c and the opened third cutoff valve 62. The brake fluid pressure supplied to the fluid pressure chamber 65 causes the simulator piston 68 to make a displacement against the spring forces by the return springs 66a and 66b, and thus the stroking of the brake pedal 12 is permitted and pseudo pedal reactive force is produced, which is applied to the brake pedal 12. As a result, the driver can obtain a brake feeling without any strangeness.

According to such a system condition, the unillustrated control unit drives the motor 72 of the motor cylinder device 16 upon detection of the stepping operation of the brake pedal 12 given by the driver, and the driving force by the motor 72 is transferred through the driving force transmission mechanism 74. Accordingly, the second and first slave pistons 88a and 88b are displaced in the direction of the arrow X1 in FIG. 2 against the spring forces by the second and first return springs 96a and 96b. The displacement of the second and first slave pistons 88a and 88b makes the brake fluid in the second fluid pressure chamber 98a and the first fluid pressure chamber 98b pressurized so as to be balanced, producing desired brake fluid pressure.

The brake fluid pressure by the second fluid pressure chamber 98a and the first fluid pressure chamber 98b of the motor cylinder device 16 is transferred to the wheel cylinders 32FR, 32RL, 32RR, and 32FL of respective disc brake mechanisms 30a to 30d through the closed first and second in-valves 120 and 124 of the VSA device 18, and the wheel cylinders 32FR, 32RL, 32RR, and 32FL are actuated. Accordingly, desired braking force is applied to each wheel.

In other words, according to the vehicular braking system 10 of this embodiment, in a normal condition in which the motor cylinder device 16 that functions as the electric braking device (power fluid pressure source) and the control unit like the unillustrated ECU performing a by-wire control can normally operate, a so-called brake-by-wire type braking system is activated which causes the communication between the master cylinder 34 that produces brake fluid pressure as the driver steps on the brake pedal 12 and respective disc brake mechanisms 30a to 30d (the wheel cylinders 32FR, 32RL, 32RR, and 32FL) controlling respective wheels to be blocked by the second and first cutoff valves 60a and 60b, and actuates the disc brake mechanisms 30a to 30d by the brake fluid pressure produced by the motor cylinder device 16. Hence, according to this embodiment, the present invention can be appropriately applied to a vehicle like an electric vehicle that has no vacuum pressure by an internal combustion engine conventionally used.

Conversely, in the abnormal condition having the motor cylinder device 16, etc., inoperable, a so-called conventional hydraulic brake system is activated which causes the second and first cutoff valves 60a and 60b to be opened and the third cutoff valve 62 to be closed, and which transfers the brake fluid pressure produced by the master cylinder 34 to the disc brake mechanisms 30a to 30d (the wheel cylinders 32FR, 32RL, 32RR, and 32FL) to actuate the disc brake mechanisms 30a to 30d (the wheel cylinders 32FR, 32RL, 32RR, and 32FL).

Figure 3:
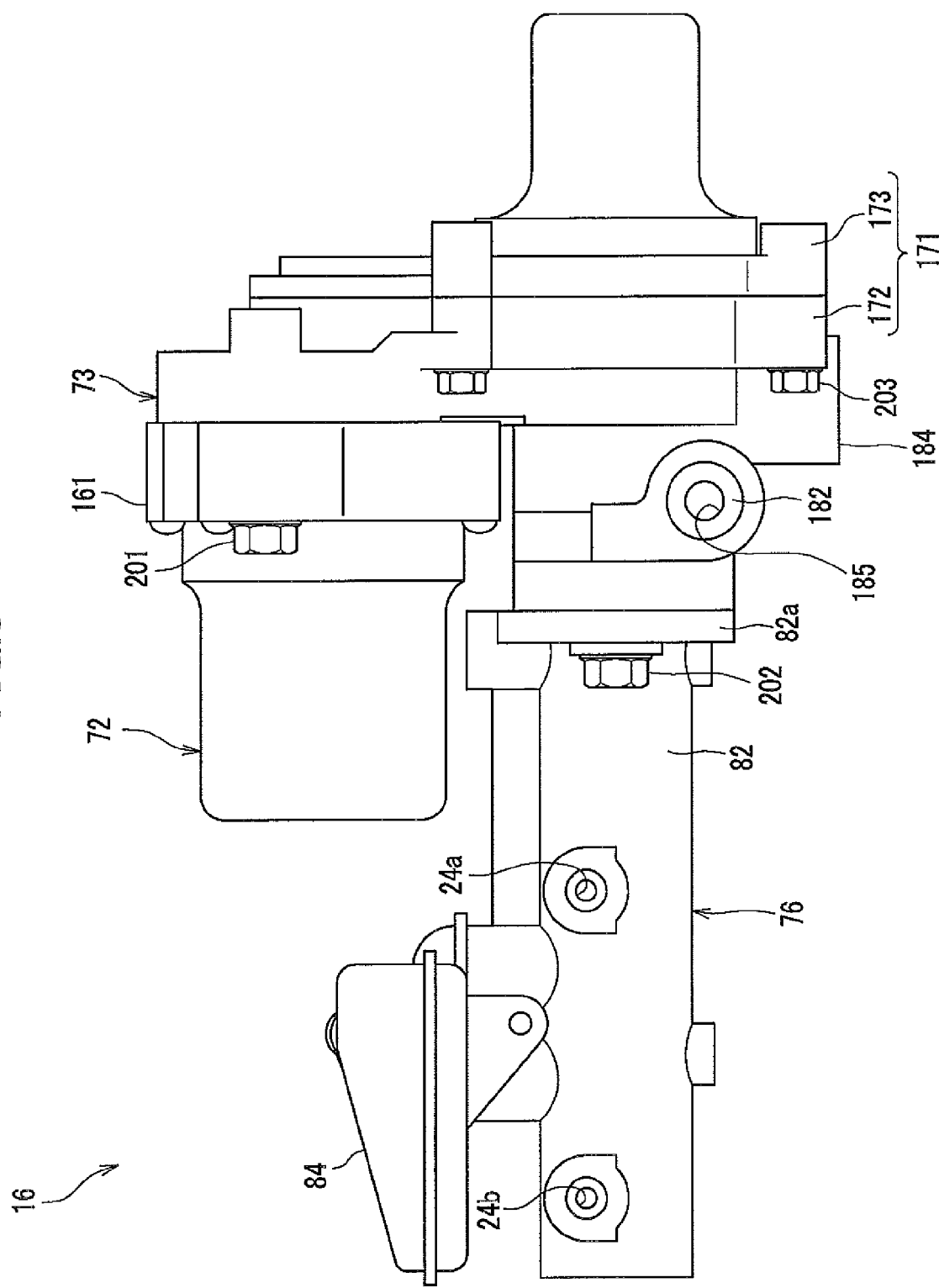
FIG. 3 is a side view of a motor cylinder device.
Figure 4:
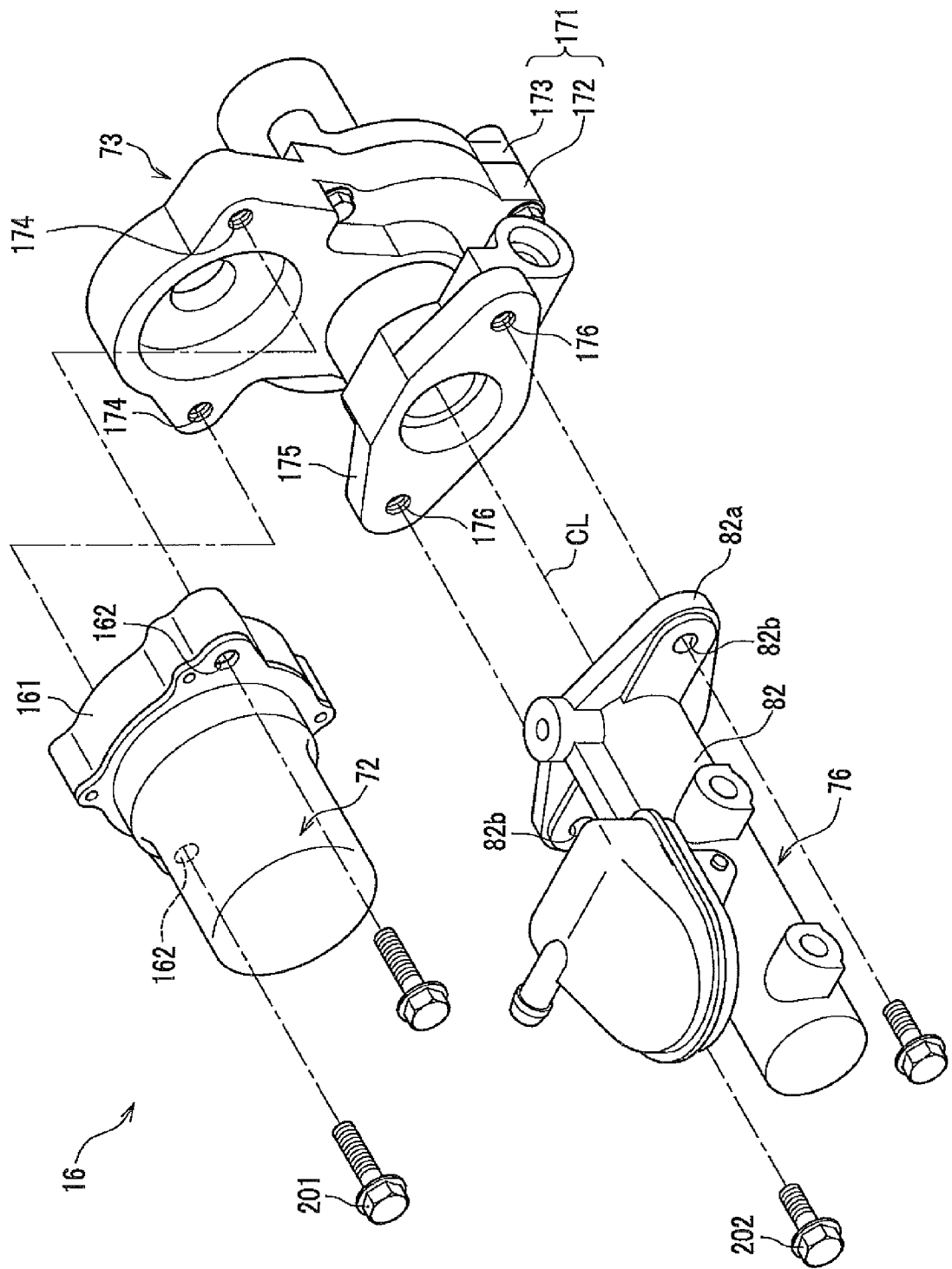
FIG. 4 is an exploded perspective view of the motor cylinder device.
Figure 5:
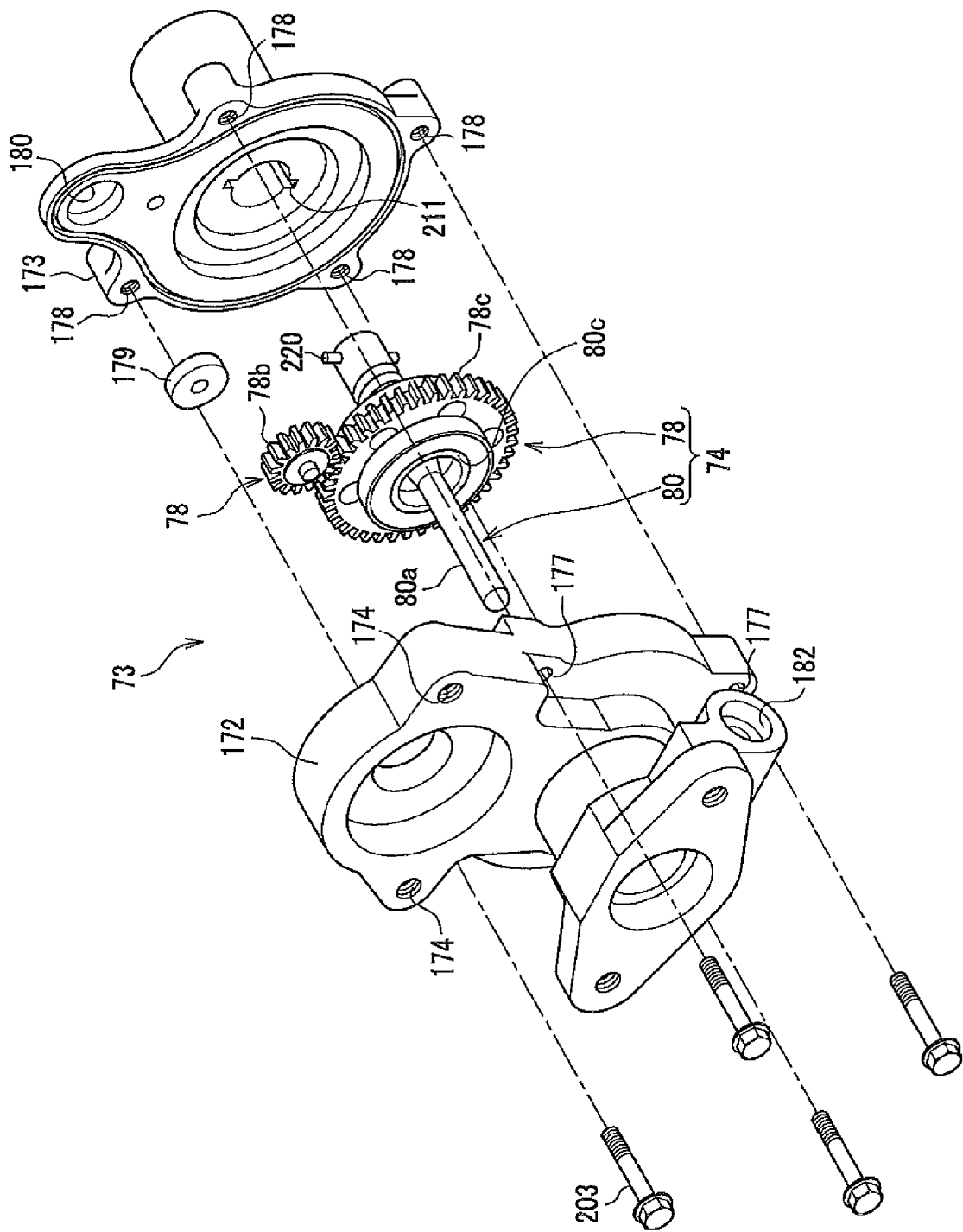
FIG. 5 is an exploded perspective view of a driving force transmission unit.

Next, a detailed explanation will be given of the motor cylinder device 16. FIG. 3 is a side view of the motor cylinder device 16. FIG. 4 is an exploded perspective view of the motor cylinder device. FIG. 5 is an exploded perspective view of the driving force transmission unit.

As shown in FIG. 3, the motor cylinder device 16 includes, as explained above, the cylinder part 76, the motor 72, and the driving force transmission unit 73. The motor 72 drives in accordance with an electric signal from the unillustrated control unit.

The motor 72 is located above the cylinder part 76. According to such a configuration, it becomes possible to prevent an oil component like a grease in the driving force transmission unit 73 from entering in the motor 72 due to the gravity and further entering in an unillustrated electrical component, etc.

As shown in FIG. 4, the motor 72, the driving force transmission unit 73, and the cylinder part 76 are separable from one another. The motor 72 has a base 161 to which an unillustrated harness is connected, and the base 161 is provided with a plurality of through holes 162 where bolts 201 are inserted. Moreover, the cylinder part 76 has a flange 82a at an end of the cylinder body 82 at the driving-force-transmission unit-73 side, and the flange 82a is provided with a plurality of through holes 82b where bolts 202 are inserted.

The driving force transmission unit 73 includes a housing 171 that retains thereinside a driving force transmission mechanism 74 (see FIG. 5) including the gear mechanism 78 and the ball screw structure 80. The housing 171 includes a case 172 disposed at the cylinder-part-76 side and a cover 173 that covers an open end of the case 172 opposite to the cylinder part 76. The case 172 and the cover 173 of the driving force transmission unit 73 are each formed of light metal like an aluminum alloy (the same is true of the cylinder body 82 of the cylinder part 76).

The case 172 of the driving force transmission unit 73 is provided with a plurality of motor attaching screw holes 174 for attaching the motor 72 to the driving force transmission unit 73. Moreover, a flange 175 is provided at an end of the case 172 at the cylinder-part-76 side, and is provided with a plurality of cylinder attaching screw holes 176 for attaching the cylinder part 76 to the driving force transmission unit 73.

By inserting the bolts 201 into the through holes 162 and fastening such bolts into the motor attaching screw holes 174, the motor 72 can be attached and fastened to the driving force transmission unit 73. Moreover, by inserting the bolts 202 in the through holes 82b and fastening such bolts into the cylinder attaching screw holes 176, the cylinder part 76 can be attached and fastened to the driving force transmission unit 73.

As shown in FIG. 5, the housing 171 (see FIG. 4) retains thereinside the gear mechanism 78 and the ball screw structure 80. The gear mechanism 78 includes a pinion gear 78a (see FIG. 2) fixed to the output shaft of the motor 72, an idle gear 78b meshed with the pinion gear 78a, and a ring gear 78c meshed with the idle gear 78b.

The ball screw structure 80 includes the nut 80c that receives the rotational driving force by the motor 72 to rotate, the ball screw shaft 80a (the screw) which is meshed (threaded) with the nut 80c but is movable in the axial direction, and which has a tip 240 (see FIG. 7) abutting the second slave piston 88a to push the second slave piston 88a (the piston), and the ball 80b (see FIG. 2) disposed in the screw groove on the ball screw shaft 80a in a rotationally movable manner.

The nut 80c is engaged with the inner circumference of the ring gear 78c through a key for example. The engagement between the nut 80c and the ring gear 78c is not limited to the engagement through a medium that is a key, and for example, the outer circumference of the nut 80c may be pressed in the inner circumference of the ring gear 78c. Accordingly, the rotational driving force transferred from the gear mechanism 78 is input in the nut 80c and converted by the ball screw structure 80 into linear driving force, and thus the ball screw shaft 80a can move in the axial direction.

The case 172 and the cover 173 of the housing 171 (see FIG. 4) are separable from each other. The case 172 is provided with a plurality of through holes 177 where bolts 203 are inserted around a center axis CL (see FIG. 4) of the second and first salve pistons 88a and 88b (see FIG. 2). A plurality of case attaching screw holes 178 are formed in portions of the cover 173 corresponding to the through holes 177, respectively. By inserting the bolts 203 into the through holes 177 and fastening such bolts into the case attaching screw holes 178, the case 172 and the cover 173 can be joined together.

A reference numeral 179 in FIG. 5 indicates a bearing that supports the tip of the output shaft of the motor 72 in a rotatable manner, and the bearing 179 is fitted in an opening 180 formed in the cover 173. Moreover, the ball screw shaft 80a is provided with a cylindrical pin 220 as a regulator that regulates a rotation of the ball screw shaft 80a. The pin 220 is, for example, pressed in a through hole formed in the direction orthogonal to the axial direction of the ball screw shaft 80a. On the other hand, the cover 173 of the housing 171 is formed with a sliding groove 211 as a guide that supports the pin 220 in a movable manner to the axial direction of the ball screw shaft 80a.

Figure 6:
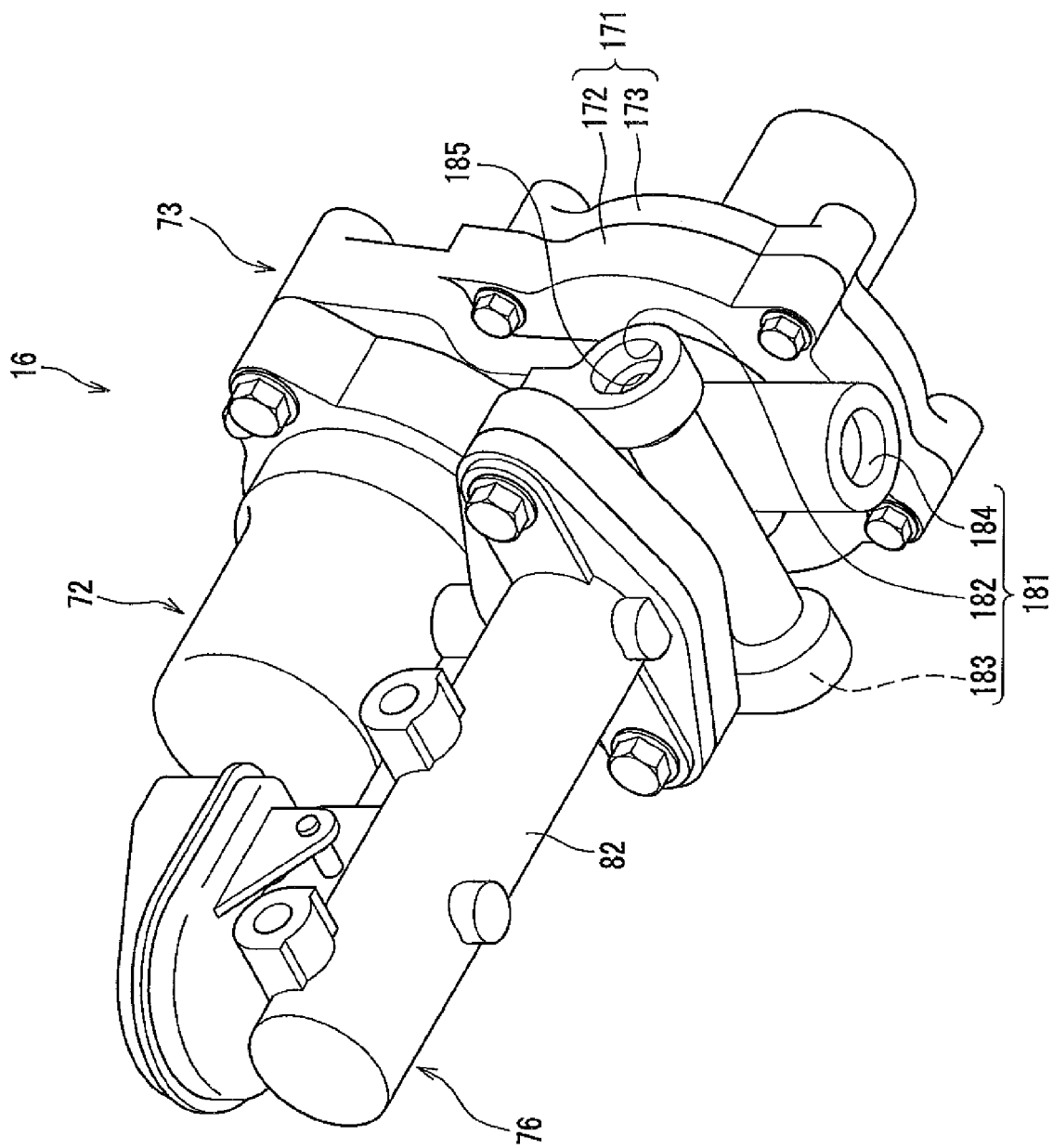
FIG. 6 is a perspective view showing the motor cylinder device as viewed from the oblique bottom.

FIG. 6 is a perspective view showing the motor cylinder device as viewed from oblique bottom.

As shown in FIG. 6, the motor cylinder device 16 is provided with a mount 181 for attaching the motor cylinder device 16 to a portion of the vehicle body 1 (see FIG. 1) like a side frame. The mount 181 has a left mount opening 182 located at the left as viewed from the cover 173 in the direction of the center axis CL (see FIG. 4), a right mount opening 183 located at the right, and a lower mount opening 184 located at the bottom. The right, left, and lower mount openings 182 to 184 each have a cylindrical recess where a rubber bushing (unillustrated) is attachable for a floating support. Moreover, the mount 181 has a through hole 185 formed along the common axis of the left mount opening 182 and the right mount opening 183 and having an axis orthogonal to the center axis CL (see FIG. 4).

The mount 181 is provided near the weight center of the motor cylinder device 16. In this example, the mount 181 is provided on the case 172 of the driving force transmission unit 73. According to such a configuration, it becomes possible to support the portion of the motor cylinder device 16 near the weight center and vibration when the motor cylinder device 16 receives force like such vibration can be reduced.

The motor cylinder device 16 is attached to the portion of the vehicle body 1 (see FIG. 1) like the side frame by the mount 181 with the aid of an attachment bracket (unillustrated). The left mount opening 182 and the right mount opening 183 can be fastened to the vehicle body by a bolt 204 inserted in the through hole 185, making the attachment of the motor cylinder device 16 easy. By using such a mount 181, the motor cylinder device 16 can be attached to the vehicle body while supporting the three points of the motor cylinder device 16: the right, left and lower points.

Figure 7:
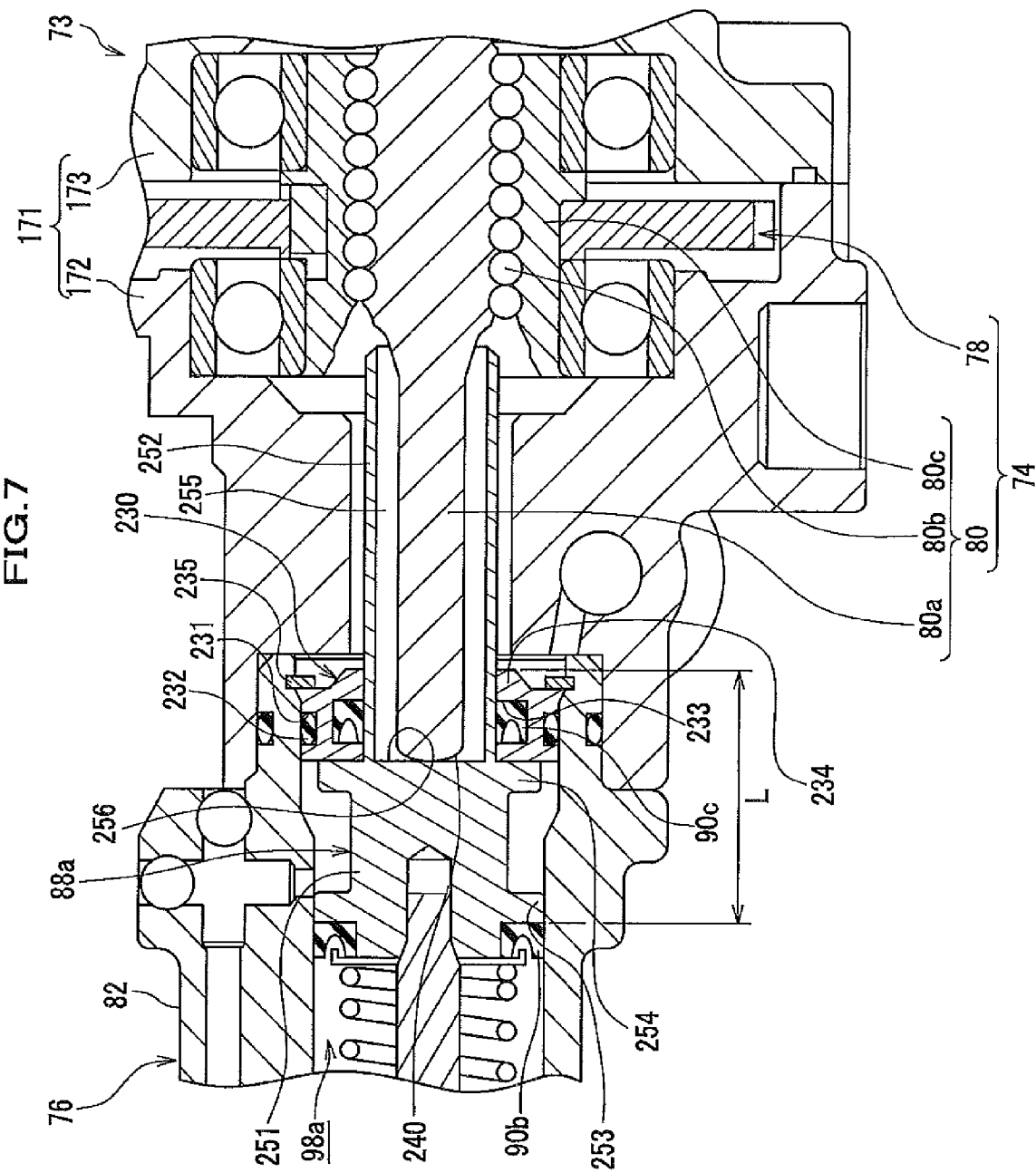
FIG. 7 is an enlarged cross-sectional view around a contact part between a ball screw shaft and a second slave piston.

Next, with reference to FIG. 7, an abutting configuration of the ball screw shaft 80a and the second slave piston 88a will be explained. FIG. 7 is an enlarged cross-sectional view around the contact portion between the ball screw shaft and the second slave piston.

As shown in FIG. 7, the second slave piston 88a includes a substantially columnar body 251, and a substantially cylindrical protrusion 252 continuously connected to the rear portion of the body 251. An annular groove 253 is formed in the front end of the outer circumference of the body 251 of the second slave piston 88a, and the slave cup seal 90b is attached to the front corner of the annular groove 253.

Conversely, an annular axial-direction regulator 254 that regulates a retraction of the second slave piston 88a by abutting the guide piston 230 is formed at the rear end of the body 251 of the second slave piston 88a. According to such a configuration, it becomes possible to assemble the second slave piston 88a in the cylinder part 76 while regulating a displacement of the second slave piston 88a by the guide piston 230, and the easiness of the assembling of the second slave piston 88a improves. The retraction of the guide piston 230 is regulated by abutting with a circlip 235 attached on the inner circumference of the rear end of the cylinder body 82.

The bottom face (corresponding to the rear end face of the body 251) of an opening 255 formed in the protrusion 252 of the second slave piston 88a and opened backwardly is formed as an abutting face 256 with the ball screw shaft 80a.

The abutting face 256 of the second slave piston 88a with the ball screw shaft 80a is flat, and the tip 240 of the ball screw shaft 80a is a convex curved face. Hence, the tip 240 of the ball screw shaft 80a and the abutting face 256 of the second slave piston 88a contact in a point by point manner. The tip 240 is formed in, for example, a shape configuring a part of a sphere. It is desirable that the curvature radius of the spherical surface of the tip 240 should be set to be larger than the diameter of the ball screw shaft 80a near the tip 240 since contact pressure can be reduced by the elastic deformation of the contact part even though it is a point-by-point contact and the ball screw shaft 80a can further stably abut the second slave piston 88a.

The annular guide piston 230 is disposed so as to face the outer circumference of the protrusion 252 of the second slave piston 88a. As explained above, the guide piston 230 fluid-tightly seals a space between the outer circumference of the second slave piston 88a and the driving force transmission mechanism 74, and guides the second slave piston 88a movable in the axial direction.

According to such a configuration, the second slave piston 88a can move forward while having the outer circumference thereof guided by the annular guide piston 230, the guided position on the outer circumference of the second slave piston 88a by a radial direction regulator 234 of the guide piston 230 moves backwardly on the second slave piston 88a relative to the forward movement of the second slave piston 88a, resulting in the increase of a support length (a guide length) L (see FIG. 7) that is a distance from the front guide position over the outer circumference of the second slave piston 88a by the annular groove 253. Hence, the falling of the second slave piston 88a can be suppressed further effectively when the second slave piston 88a is driven in the axial direction. This also suppresses a partial worn-out of the contact part between the ball screw shaft 80a and the second slave piston 88a.

An annular groove 231 is formed in the outer circumference of the guide piston 230 and an O-ring 232 that is a seal member is attached in this annular groove 231. Moreover, an annular groove 233 is formed in the inner circumference of the guide piston 230, and the cup seal 90c that is a seal member with a cross section in a cup shape is attached in this annular groove 233.

The cup seal 90c and the O-ring 232 are located backwardly of the axial direction regulator 254. When the axial direction regulator 254 is disposed backwardly of the cup seal 90c and the O-ring 232, the whole length of the second slave piston 88a increases because of the presence of the axial direction regulator 254, but a configuration is employed in which it is not necessary to disposed the axial direction regulator 254 backwardly of the cup seal 90c and the O-ring 232, and thus the whole length of the second slave piston 88a can be reduced.

The radial direction regulator (a regulator) 234 that regulates the displacement of the second slave piston 88a in the radial direction is formed at the rear end of the guide piston 230. The radial direction regulator 234 is disposed at the outer-circumference side of the second slave piston 88a, and is located backwardly of the abutting face 256 in the axial direction.

Since the displacement of the second slave piston 88a in the radial direction is regulated at the backward position from the abutting face 256 of the second slave piston 88a with the ball screw shaft 80a, a falling of the second slave piston 88a when the second slave piston 88a is pushed by the ball screw shaft 80a can be suppressed. Accordingly, a partial worn-out of the contact part between the ball screw shaft 80a and the second slave piston 88a can be suppressed.

At the retraction limit position (a stroke end, see FIG. 7) where the axial direction regulator 254 abuts the guide piston 230 and the guide piston 230 abuts the circlip 235, the second slave piston 88a has the body 251 with the front end thereof disposed toward the second fluid pressure chamber 98a formed ahead of the second slave piston 88a and has the protrusion 252 with the rear end thereof protruding toward the housing 171 that retains the driving force transmission mechanism 74.

Hence, by ensuring the large support length for the second slave piston 88a without increasing the dimension of the motor cylinder device 16 in the axial direction of the second slave piston 88a, it becomes possible to further surely suppress a falling of the second slave piston 88a. Moreover, it is also possible to prevent the brake fluid in the cylinder part 76 from entering in the housing 171.

Furthermore, the housing 171 and the cylinder body 82 are formed as separate pieces, and the guide piston 230 is retained in the cylinder body 82. According to such a configuration, all parts disposed in the cylinder body 82 can be regulated by the guide piston 230 so as not to be detached from the normal positions in a fluid-tight condition. Hence, the handling of the whole cylinder part 76 including the assembling thereof becomes easy.

As explained above, according to this embodiment, in the electric braking device that produces brake fluid pressure by driving the second slave piston 88a and the first slave piston 88b in the axial direction with the aid of the driving force by the motor 72, the driving force transmission mechanism 74 for transferring the driving force by the motor 72 includes the nut 80c that is rotated upon reception of the rotational driving force by the motor 72, and the ball screw shaft 80a which is engaged with the nut 80c in a movable manner in the axial direction and which abuts the second slave piston 88a, and worn-out reducer for reducing a worn-out of the contact part between the ball screw shaft 80*a* and the second slave piston 88*a* is provided. The worn-out reducer is configured by the abutting face 256 of the second slave piston 88*a* with the ball screw shaft 80*a* formed in the flat shape and the tip 240 of the ball screw shaft 80*a* formed in a convex curved shape.

The abutting structure of the ball screw shaft 80*a* and the second slave piston 88*a* configured as explained above works as follows.

That is, when the nut 80*c* receives the rotational driving force by the motor 72, the ball screw shaft 80*a* engaged with the nut 80*c* is moved forward in the axial direction with the tip 240 of the ball screw shaft 80*a* abutting the abutting face 256 of the second slave piston 88*a* to push the second slave piston 88*a*, and thus the second slave piston 88*a* is driven to move forward.

At this time, the tip 240 of the ball screw shaft 80*a* in the convex curved shape contacts the flat abutting face 256 of the second slave piston 88*a* in a point-by-point contact manner, and thus the tip 240 of the ball screw shaft 80*a* hardly receives force in the radial direction from the abutting face 256 of the second slave piston 88*a*.

Hence, according to this embodiment, the worn-out of the contact part between the ball screw shaft 80*a* and the second slave piston 88*a* can be reduced, thereby ensuring a stable abutment of the ball screw shaft 80*a* to the second slave piston 88*a*. Hence, it is possible to prevent the second slave piston 88*a* from falling when the second slave piston 88*a* is driven in the axial direction, and thus a worn-out or a damage of the second slave piston 88*a*, the sliding face of the cylinder body 82 to the second slave piston 88*a*, the slave cup seal 90*b* and the cup seal 90*c* which are seal members attached to the second slave piston 88*a*, etc., can be suppressed.

If, for example, the tip 240 of the ball screw shaft 80*a* and the abutting face 256 of the second slave piston 88*a* are concavo and convex spherical surfaces, an axial alignment effect acts in a direction in which the axial misalignment of the tip 240 of the ball screw shaft 80*a* is addressed, and the tip 240 of the ball screw shaft 80*a* receives force in the radial direction from the second slave piston 88*a*. As a result, this contact part becomes worn out and pressing load in an oblique direction to the axial direction of the second slave piston 88*a* is input from the ball screw shaft 80*a* to the worn-out portion, often making the second slave piston 88*a* tilted. Moreover, if, for example, the tip 240 of the ball screw shaft 80*a* and the abutting face 256 of the second slave piston 88*a* are both flat surfaces, both surfaces may partially contact with each other due to the axial misalignment, and thus this contact part is often worn out. Furthermore, if the tip 240 of the ball screw shaft 80*a* and the abutting face 256 of the second slave piston 88*a* contact in a plane-by-plane contact manner, the second slave piston 88*a* is rotated together with the rotation of the ball screw shaft 80*a*, and thus the contact part between both members and the seal member added to the second slave piston 88*a* may be worn out. In contrast, according to the abutment structure of the ball screw shaft 80*a* and the second slave piston 88*a* in this embodiment, such technical issues can be addressed.

The present invention was explained based on an embodiment thereof, but the present invention is not limited to the configurations explained in the embodiment, and can be changed and modified in various forms without departing from the scope and spirit of the present invention including an appropriate combination and selection of the configurations explained in the embodiment.

For example, according to the above-explained embodiment, the explanation was given of the cylinder part 76 that is a so-called tandem type having the second and first slave pistons 88*a* and 88*b* arranged side by side in the direction of the center axis CL (see FIG. 4). The present invention is, however, not limited to such a type, and can be applicable to the electric braking device having a cylinder part with a piston and a fluid pressure chamber formed ahead of the piston one by one.

What is claimed is:

1. An electric braking device comprising:
    a cylinder part that retains thereinside a piston movable in an axial direction;
    a motor for driving the piston; and
    a driving force transmission mechanism that transfers driving force by the motor to the piston,
    the electric braking device producing brake fluid pressure by driving the piston in the axial direction with the driving force by the motor,
    the driving force transmission mechanism comprising:
        a nut that is rotated upon reception of rotational driving force by the motor; and
        a screw which is engaged with the nut in a movable condition in the axial direction and which abuts the piston,
    the electric braking device further comprising a worn-out reducer for reducing a worn-out of a contact part between the screw and the piston, and
    a regulator which is disposed on an outer circumference of the piston to regulate a displacement of the piston in a radial direction, wherein
        the worn-out reducer is configured by an abutting face of the piston with the screw; wherein said abutting face of the piston is formed in a flat shape, and a tip portion of the screw facing the face of the piston is formed in a convex curved shape, and wherein
        the tip portion of the screw forms a part of a sphere, and a curvature radius of a spherical surface of the tip portion of the screw is set to be larger than a diameter of a portion of the screw near the tip portion of the screw.

2. The electric braking device according to claim 1, wherein the worn-out reducer is configured such that, during operation, a contact between the tip portion of the screw and the piston is established in a point-by-point manner for slidably moving the piston in the cylinder part.

3. An electric braking device comprising:
    a cylinder part that retains thereinside a piston movable in an axial direction;
    a motor for driving the piston; and
    a driving force transmission mechanism that transfers driving force by the motor to the piston,
    the electric braking device producing brake fluid pressure by driving the piston in the axial direction with the driving force by the motor,
    the driving force transmission mechanism comprising:
        a nut that is rotated upon reception of rotational driving force by the motor; and
        a screw which is engaged with the nut in a movable condition in the axial direction and which abuts the piston,
    the electric braking device further comprising:
    a worn-out reducer for reducing a worn-out of a contact part between the screw and the piston, and
    a regulator which is disposed on an outer circumference of the piston to regulate a displacement of the piston in a radial direction,
    wherein the regulator is located at the driving force transmission mechanism side beyond an abutting face of the piston in the axial direction of the piston.

4. The electric braking device according to claim 3, wherein at a maximum movable position of the piston toward the driving force transmission mechanism, the piston has a first end disposed toward a fluid pressure chamber formed opposite to the driving force transmission mechanism, and has a second end protruding toward a housing retaining the driving force transmission mechanism.

5. The electric braking device according to claim 4, wherein
the cylinder part comprising a cylinder body retaining thereinside the piston in a slidable manner, and an annular guide which is retained in the cylinder body to fluid-tightly seal a space between the outer circumference of the piston and the driving force transmission mechanism, and which guides the piston movable in the axial direction of the piston, and
the guide comprises the regulator.

6. The electric braking device according to claim 3, wherein
the cylinder part comprising a cylinder body retaining thereinside the piston in a slidable manner, and an annular guide which is retained in the cylinder body to fluid-tightly seal a space between the outer circumference of the piston and the driving force transmission mechanism, and which guides the piston movable in the axial direction of the piston, and
the guide comprises the regulator.

7. An electric braking device comprising:
a cylinder part that retains thereinside a piston movable in an axial direction;
a motor for driving the piston; and
a driving force transmission mechanism that transfers driving force by the motor to the piston,
the electric braking device producing brake fluid pressure by driving the piston in the axial direction with the driving force by the motor,
the driving force transmission mechanism comprising:
a nut that is rotated upon reception of rotational driving force by the motor; and
a screw which is engaged with the nut in a movable condition in the axial direction and which abuts the piston,
the electric braking device further comprising:
a worn-out reducer for reducing a worn-out of a contact part between the screw and the piston, the worn-out reducer having an abutting face including an end portion of the piston formed in a flat shape and a tip of the screw at the piston side formed in a convex curved shape, and
a regulator which is disposed on an outer circumference of the piston to regulate a displacement of the piston in a radial direction,
wherein the regulator is located at the driving force transmission mechanism side beyond the abutting face in the axial direction of the piston.

8. The electric braking device according to claim 7, wherein at a maximum movable position of the piston toward the driving force transmission mechanism, the piston has a first end disposed toward a fluid pressure chamber formed opposite to the driving force transmission mechanism, and has a second end protruding toward a housing retaining the driving force transmission mechanism.

9. The electric braking device according to claim 8, wherein
the cylinder part comprising a cylinder body retaining thereinside the piston in a slidable manner, and an annular guide which is retained in the cylinder body to fluid-tightly seal a space between the outer circumference of the piston and the driving force transmission mechanism, and which guides the piston movable in the axial direction of the piston, and
the guide comprises the regulator.

10. The electric braking device according to claim 7, wherein
the cylinder part comprising a cylinder body retaining thereinside the piston in a slidable manner, and an annular guide which is retained in the cylinder body to fluid-tightly seal a space between the outer circumference of the piston and the driving force transmission mechanism, and which guides the piston movable in the axial direction of the piston, and
the guide comprises the regulator.

* * * * *